(No Model.)
R. MORRISON.
COMPOSITION FOR SELF LUBRICATING PACKING.
No. 285,648. Patented Sept. 25, 1883.
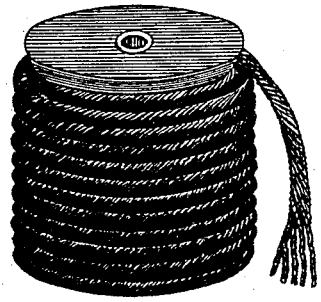
Attest
John Lockie
Jas. L. Skidmore.
Inventor
Robert Morrison
Per W. R. Singleton
Atty

UNITED STATES PATENT OFFICE.

ROBERT MORRISON, OF ST. LOUIS, MISSOURI.

COMPOSITION FOR SELF-LUBRICATING PACKING.

SPECIFICATION forming part of Letters Patent No. 285,648, dated September 25, 1883.

Application filed June 29, 1883. (No model.)

*To all whom it may concern:*

Be it known that I, ROBERT MORRISON, a citizen of the United States, residing at St. Louis, in the State of Missouri, have invented certain new and useful Improvements in Compositions for Self-Lubricating Packing, of which the following is a specification, reference being had therein to the accompanying drawing.

This invention relates to an improvement in the "self-lubricating packing for steam-engines, pumps, and blowing-engines, and for all purposes where packing is required," which packing was patented to me November 8, 1881, and numbered 249,385.

The accompanying drawing is a perspective view showing my packing-rope wound on a cylinder.

It consists in adding to the ingredients used by me a certain other material known in the arts as "gum cement;" and that the process of making this improved packing may be more fully understood I shall proceed to describe the method as follows:

As in the former patent, I take equal quantities of cotton and hemp fiber, and spin them together into rope of such sizes as may be required to effectually pack a rod, piston, &c. While the strands are being spun, ten pounds of pulverized plumbago to fifty pounds each of the cotton and hemp fiber are dusted into the fiber as it is being spun. After these strands are thus formed they are saturated with a mixture of fifteen pounds of tallow, three pounds of beeswax, and the gum cement about ten per cent. of the other two, which will be a little over one and three-quarters pound.

The advantage of employing gum cement, which is made by dissolving pure gum in benzine until it becomes liquid, in connection with the beeswax and tallow is that it causes the ingredients to adhere more closely to the fibers of the hemp and cotton, thereby giving the packing more solidity, and preventing the lubricants from escaping when heated. These three ingredients are melted together and boiled for about twenty-five to thirty minutes. These proportions are approximate, and I do not confine myself strictly to them, as a slight variation may be made in them and not change the nature or value of the composition for lubricating.

As an improvement upon my former patent of November 8, 1881, No. 249,385, I claim—

A self-lubricating packing made of strands of cotton and hemp, in equal quantities, previously dusted with pulverized plumbago, then twisted into rope, and finally saturated with a hot mixture of beeswax and tallow and ten per cent. of gum cement, all substantially as and for the purpose described.

In testimony whereof I affix my signature in presence of two witnesses.

ROBERT MORRISON.

Witnesses:
 W. A. HEYNEMBOURG,
 CLEM SINGLETON.